Nov. 19, 1957  H. D. WOLCOTT  2,813,409
UNIVERSAL COUPLING
Filed Nov. 8, 1954
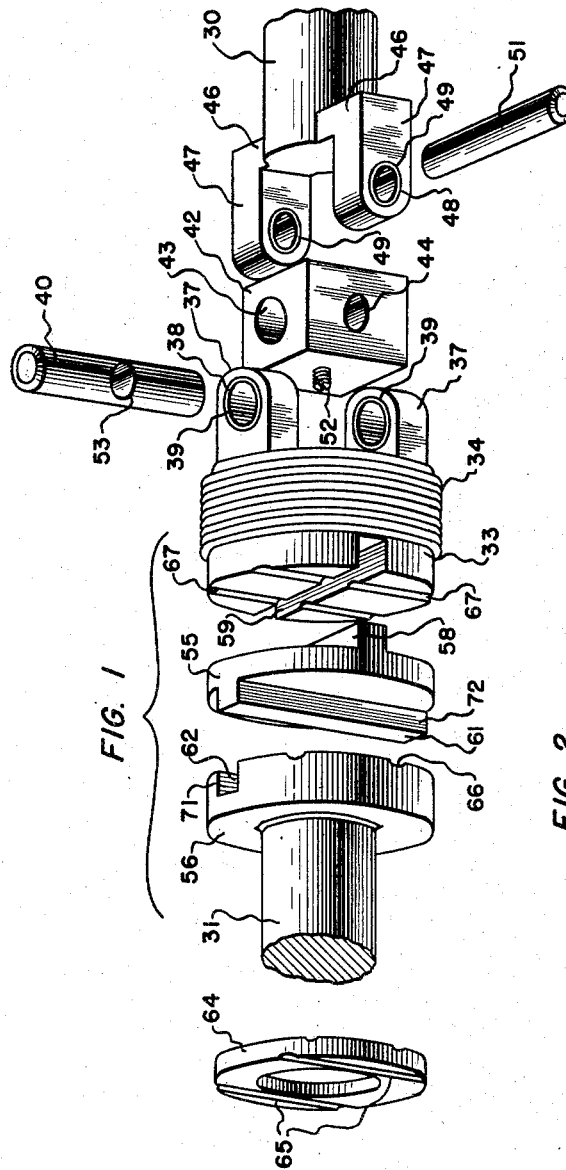
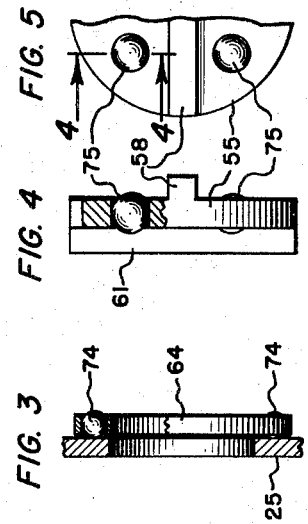
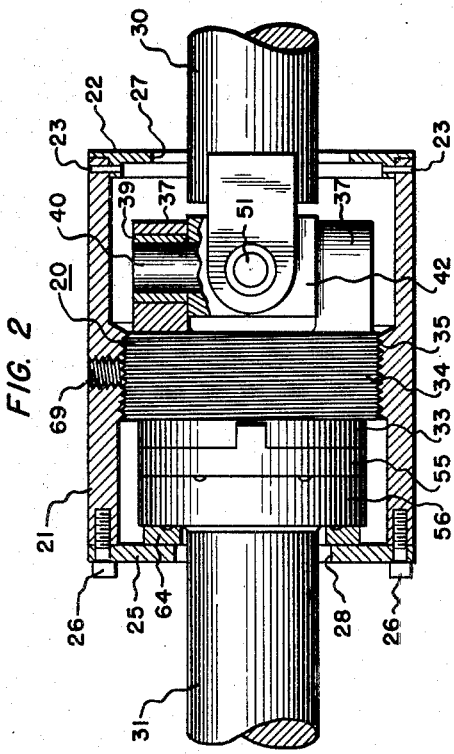
INVENTOR.
HAROLD D. WOLCOTT
BY *Pulvider, Mattingly and Huntley*
ATTORNEYS United States Patent Office 2,813,409
Patented Nov. 19, 1957

2,813,409

UNIVERSAL COUPLING

Harold D. Wolcott, La Jolla, Calif., assignor of one-half to Victor Lundy and Lottie L. Crawford, San Diego, Calif.

Application November 8, 1954, Serial No. 467,560

6 Claims. (Cl. 64—17)

The present invention relates to universal couplings for shafts and more particularly to a coupling which compensates for lateral as well as angular axial displacement or misalignment of shafts.

The present invention includes a main coupling member. One of the shafts, to be coupled, is pivotally connected to a portion or portions of the main coupling member, which extends axially from one end of said member in such manner as to compensate for angular axial displacement of said shaft with respect to the other shaft to be coupled.

A second coupling member is connected with the opposite end of the main coupling member through a tongue on one of said members and a groove in the other, said tongue and groove extending at right angles to the axis of the main and second coupling members. The aforementioned other shaft is connected with a third coupling member, which latter is connected with the second coupling member through tongue and groove relationship; the latter tongue and groove are also at right angles to the axis of the coupling members and also intersect the axis of the coupling members at right angles to the first-mentioned tongue and groove.

The universal coupling of the present invention is self sustaining in that the second and third coupling members, although connected with one another and with the main coupling member for independent movement, are tied to the main coupling member to prevent excessive axial movement relative to one another.

Further objects and advantages will be apparent from the following description, reference being had to the accompanying drawings wherein preferred embodiments of the invention are illustrated.

In the drawings:

Fig. 1 is a perspective view showing all the parts of the coupling, except the housing, separated from one another but in alignment in the manner in which they are assembled;

Fig. 2 is a side view of the coupling including the housing thereof, the housing and fragments of parts of the coupling members being shown in section;

Fig. 3 is a side view, partly in section, of a modified form of thrust ring and associated end plate;

Fig. 4 is a side view, partly in section, of a modified form of coupling member, the section being taken on line 4—4 of Fig. 5; and Fig. 5 is a fragmentary side view of the coupling member shown in Fig. 4.

Referring more in detail to the drawings, the coupling 20 includes a housing 21, preferably cylindrical in shape, as viewed in Fig. 2; the right end cover 22 for the housing is pinned in place by pins 23, and the left end cover 25 is held in place by screw 26. These end covers are provided respectively with openings 27 and 28 for the reception respectively of shafts 30 and 31.

The coupling includes the main coupling member 33, which is threaded as at 34 and is received by the threads 35 disposed substantially midway between the ends and in the interior of the housing 21. The main coupling member 33 includes a pair of axially-extending ears 37, and these ears are provided with aligned holes 38 which receive bearing bushings 39. As shown, these holes 38 and bushings 39 are disposed at right angles to and intersect the axis of the main coupling member 33. These bushings 39 receive a pin 40.

A bearing block 42 is disposed between the ears 37 and is provided with a hole 43. The pin 40 extends through ears 37 and hole 43 for retaining the block 42 in position. Obviously, the hole 43 is also at right angles to and intersects the axis of the main coupling member 33. A second hole 44 is drilled through the block 42 at right angles to the hole 43. This hole 44 is also at right angles to and intersects the axis of the coupling member 33.

The shaft 30 is provided with a yoke 46 including parallelly extending legs 47. These legs 47 are provided with aligned holes 48 which receive bearing bushings 49. The inside diameter of the bearing bushings 49 and the hole 44 in the block 42 are substantially the same. The legs 47 span the bearing block 42 with the bushings 49 aligned with the hole 44 in the block 42. These aligned bushings 49 and hole 44 receive a pin 51, and this pin is held in place by a set screw 52 passing through a side wall of the block 42. The pin 51 extends through a transverse hole 53 in the pin 40.

The shaft 30 can pivot about the pin 51, and the shaft including the block 42 can pivot about the pin 40 at right angles with respect to the pivotal connection between the shaft and the pin 51. By reason of the double pivotal connection between the shaft 30 and the main coupling member 33, such relationship compensates for angular axial displacement or misalignment of the shaft 30 with respect to the axis of the coupling member 33, in other words the ears 37, pin 40, block 42, pin 51 and ears 47 cooperate to form a universal joint on the main coupling member 33.

The opposite end, as viewed in the drawings, of the coupling member is connected with a second coupling member 55, which in turn is connected with a third coupling member 56, the latter being suitably attached to the shaft 31. These connections are through tongue and groove relationship between coupling members 55 and 33 and between coupling members 56 and 55. Either of the coupling members 55 or 33 may be provided with the tongue and, of course, the other would be provided with the groove.

In the instant embodiment, the tongue 58 is formed integrally with the coupling member 55 and projects axially from the faces thereof confronting the end face of coupling member 33, and the groove 59 is formed in said end face of the coupling member 33. The groove 59 is disposed at right angles to and intersects the axis of the coupling member 33. The tongue 58 is at right angles to and intersects the axis of the coupling member 55. Likewise, the tongue for connecting the coupling member 55 with the third coupling member 56 may be formed in either of the said coupling members and, of course, the groove in the other. In the preferred embodiment, this tongue 61 is formed integrally with the coupling member 55 and the groove 62 is formed in the face of the coupling member 56, which confronts the left side of coupling member 55. The tongue 61 is disposed at right angles to and intersects the axis of the coupling member 55, and is disposed at right angles to the tongue 58. The groove 62 is disposed at right angles to and intersects the common axis of the shaft 31 and coupling member 56.

A thrust ring 64 bears against the outer or right face of the coupling member 56, and this ring is held in place by a shoulder herein comprising the end cover 25. Suitable oil grooves 65 are formed on opposite sides of the thrust ring 64 for the purpose of directing lubricant to between the moving parts, and similar oil grooves 66 and 67 are formed respectively in coupling members 56 and 33 for lubricating the tongues and grooves and the confronting faces of the coupling members. The main coupling member 33, and consequently the other moving parts of this universal coupling, are held in adjusted position within the housing 21 by the said screw or screws 69.

Since coupling member 55 may be moved at right angles with respect to the common axis of the shaft 31 and coupling member 56, and since coupling member 55 can also move at right angles with respect to the coupling member 33, such movements provide for driving connection between the shaft 31 and the coupling member 33, although the axes of the shaft 31 and the coupling member 33 are laterally displaced or laterally misaligned.

Thus, by the present invention the universal coupling member 33 and its cooperating parts provide for compensating for lateral as well as angular displacement or misalignment of shafts 31 and 30.

Preferably, the side faces 71 of grooves 62 lie parallel to one another in an axial direction and, likewise, the side faces 72 of the tongues 61 lie parallel to one another in an axial direction. In this manner there is no tendency for camming effect between the tongue 61 and the groove 62. Likewise, the tongue 58 and the groove 59 are constructed in the same manner and for the same reason.

Instead of employing oil grooves 65, 66, and 67, antifriction bearings may be used, herein shown as ball bearings 74 in the thrust ring 64, and ball bearings 75 in the second coupling member 55. Ball bearings 74 extend through the thrust ring 64 and bear against the end plate 25 and the confronting face of the coupling member 56. Likewise, the ball bearings 75 extend through the coupling member 55 and bear against the confronting face of coupling member 56 and the opposite main coupling member 33.

While the forms of embodiment herein shown and described constitute preferred forms, it is to be understood that other forms may be adopted falling within the scope of the claims that follow.

I claim:

1. In combination with two shafts that are displaced laterally as well as axially of one another, a universal coupling for said shafts comprising in combination, a universal joint connected with one of said shafts, said universal joint including a rotatable main coupling member substantially axially aligned with said one shaft and having a portion extending axially from one side thereof, said universal joint including a coupling member disposed transversely of the axis of the rotatable main coupling member and pivotally connected with said portion, and including a coupling element disposed transversely of said one shaft and pivotally connected with said one shaft and the first mentioned coupling element; a second coupling member disposed axially of the main coupling member at the side of the main coupling member opposite said portion, one of said coupling members having a tongue on the side thereof confronting the side of the other said coupling members, and the other said coupling members having a groove for receiving the tongue; a third coupling member attached to the other said shafts, said third coupling member having a side confronting a side of the second coupling member and having an outer side opposite the first mentioned side thereof, one of said second and third coupling members having a tongue on the side thereof confronting the side of the other of said second and third coupling members, and the other of said second and third coupling members having a groove for receiving the latter mentioned tongue; and means attached to the first coupling member for slidably bearing on the outer side of the third coupling member for retaining the coupling members in driving relationship.

2. A universal coupling as defined in claim 1, characterized in that the retaining means comprises a thrust ring, the inner face of said ring being frictionally engageable with the outer face of the third-mentioned coupling member, and comprises a shoulder slidably bearing against the outer face of said ring.

3. A universal coupling as defined in claim 1, characterized in that the means therein defined includes a housing surrounding the coupling members.

4. In combination with two shafts that are displaced laterally as well as axially of one another, a universal joint for said shafts, comprising in combination, a rotatable main coupling member having a pair of spaced ears extending parallelly of the axis and from one side of said member, said ears having aligned holes; a coupling block disposed between said ears and having a hole therethrough aligned with the holes in said ears; a coupling pin extending through the holes in the ears and the block, said block having a second hole therethrough at right angles to the first-mentioned hole therein and transverse of the axis of the main coupling member; a yoke on said shaft, said yoke having spaced legs extending parallelly of the axis of the shaft, said legs spanning the coupling block and said legs having holes aligned with the second-mentioned hole in said block; a coupling pin extending through said holes in the legs and the second-mentioned hole in the block; a second coupling member disposed axially of the main coupling member opposite the ears, one of said members having a tongue on the side thereof confronting the side of the other of said members and the other of said members having a groove for receiving the tongue; a third coupling member on the other of said shafts, said third coupling member having a side confronting a side of the second coupling member and having an outer side opposite the first mentioned side thereof, one of said second and third coupling members having a tongue on the face thereof confronting the face of the other of said second and third coupling members, and the other of said second and third coupling members having a groove for receiving the latter-mentioned tongue; and means attached to the first coupling member and slidably bearing on the outer side of the third coupling member for retaining the coupling members in driving relationship.

5. A universal coupling as defined in claim 4, characterized in that the retaining means comprises a housing surrounding the coupling members.

6. A universal coupling as defined in claim 4, characterized in that the retaining means comprises a housing surrounding the coupling members, said ears, coupling block and yoke.

References Cited in the file of this patent

UNITED STATES PATENTS

| | | |
|---|---|---|
| 1,780,554 | Floss | Nov. 4, 1930 |
| 1,907,447 | Schiltze | May 9, 1933 |
| 2,369,810 | Stillwagon | Feb. 20, 1945 |
| 2,547,518 | Benjamin et al. | Apr. 3, 1951 |